US008408907B2

(12) United States Patent
Herbert et al.

(10) Patent No.: US 8,408,907 B2
(45) Date of Patent: Apr. 2, 2013

(54) AUTOMATED IMPROVISED EXPLOSIVE DEVICE TRAINING SYSTEM

(75) Inventors: Robert Herbert, San Diego, CA (US); Chris Brisson, San Diego, CA (US); David Haberman, La Jolla, CA (US)

(73) Assignee: Cubic Corporation, San Diego, CA (US)

( * ) Notice: Subject to any disclaimer, the term of this patent is extended or adjusted under 35 U.S.C. 154(b) by 1656 days.

(21) Appl. No.: 11/780,414

(22) Filed: Jul. 19, 2007

(65) Prior Publication Data

US 2012/0214135 A1    Aug. 23, 2012

Related U.S. Application Data

(60) Provisional application No. 60/807,811, filed on Jul. 19, 2006.

(51) Int. Cl.
*F41A 33/00* (2006.01)
(52) U.S. Cl. .............................. 434/11; 434/22
(58) Field of Classification Search ............... 434/11–19
See application file for complete search history.

(56) References Cited

U.S. PATENT DOCUMENTS

| | | | | |
|---|---|---|---|---|
| 3,540,136 A * | 11/1970 | Billingsley | | 434/11 |
| 4,744,761 A * | 5/1988 | Doerfel et al. | | 434/13 |
| 4,752,226 A * | 6/1988 | Akers et al. | | 434/11 |
| 4,771,344 A * | 9/1988 | Fallacaro et al. | | 386/226 |
| 5,074,793 A * | 12/1991 | Hambric et al. | | 434/11 |
| 5,207,579 A * | 5/1993 | Campagnuolo | | 434/11 |
| 5,292,254 A * | 3/1994 | Miller et al. | | 434/11 |
| 5,326,268 A * | 7/1994 | Campagnuolo | | 434/15 |
| 5,511,978 A * | 4/1996 | Sellers et al. | | 434/11 |
| 5,556,281 A * | 9/1996 | FitzGerald et al. | | 434/16 |
| 5,571,018 A * | 11/1996 | FitzGerald | | 434/16 |
| 5,690,491 A * | 11/1997 | FitzGerald et al. | | 434/16 |
| 5,801,322 A * | 9/1998 | Laine et al. | | 102/401 |
| 6,254,394 B1 * | 7/2001 | Draper et al. | | 434/11 |
| 6,283,756 B1 * | 9/2001 | Danckwerth et al. | | 434/11 |
| 6,450,817 B1 * | 9/2002 | Deinlein | | 434/11 |
| 6,579,097 B1 | 6/2003 | Sampson et al. | | |
| 6,599,127 B1 | 7/2003 | Hopmeier et al. | | |
| 6,899,539 B1 | 5/2005 | Stallman et al. | | |
| 7,499,713 B2 * | 3/2009 | Gasbarro et al. | | 455/456.1 |
| 7,507,089 B2 * | 3/2009 | Jones et al. | | 434/11 |
| 7,568,431 B1 * | 8/2009 | Stria | | 102/355 |
| 7,922,491 B2 * | 4/2011 | Jones et al. | | 434/11 |
| 8,011,928 B1 * | 9/2011 | Schaeffer et al. | | 434/11 |
| 8,016,594 B2 * | 9/2011 | Ferris et al. | | 434/11 |
| 8,128,405 B2 * | 3/2012 | Preston et al. | | 434/11 |
| 2003/0027103 A1 * | 2/2003 | Preston et al. | | 434/11 |
| 2006/0246922 A1 * | 11/2006 | Gasbarro et al. | | 455/456.6 |
| 2007/0009859 A1 * | 1/2007 | Preston et al. | | 434/11 |
| 2008/0280264 A1 * | 11/2008 | Segall | | 434/11 |
| 2009/0246740 A1 * | 10/2009 | Jones et al. | | 434/11 |
| 2009/0263765 A1 * | 10/2009 | Jones et al. | | 434/11 |
| 2011/0048273 A1 * | 3/2011 | Colon | | 102/530 |

* cited by examiner

*Primary Examiner* — Robert J Utama
(74) *Attorney, Agent, or Firm* — Kilpatrick Townsend & Stockton LLP

(57) ABSTRACT

A system and method for an automated improvised explosive device training is disclosed. According to one embodiment of the present invention, the system utilizes an IED mock-up that embeds a processor and wireless modem. A separate processor and wireless modem is embedded in a trainee unit. A wireless network interface is provided, allowing for communication between the IED and trainee processors. Upon a simulated detonation, the IED processor queries each trainee unit for their current position using a wireless local area network message. The IED processor is configured to determine distance differentiation and casualty assessment data based on received signal strength of exchanged wireless messages or GPS coordinates. The trainee processor is configured to automatically signal casualty status to the trainee based on casualty assessment data.

26 Claims, 5 Drawing Sheets

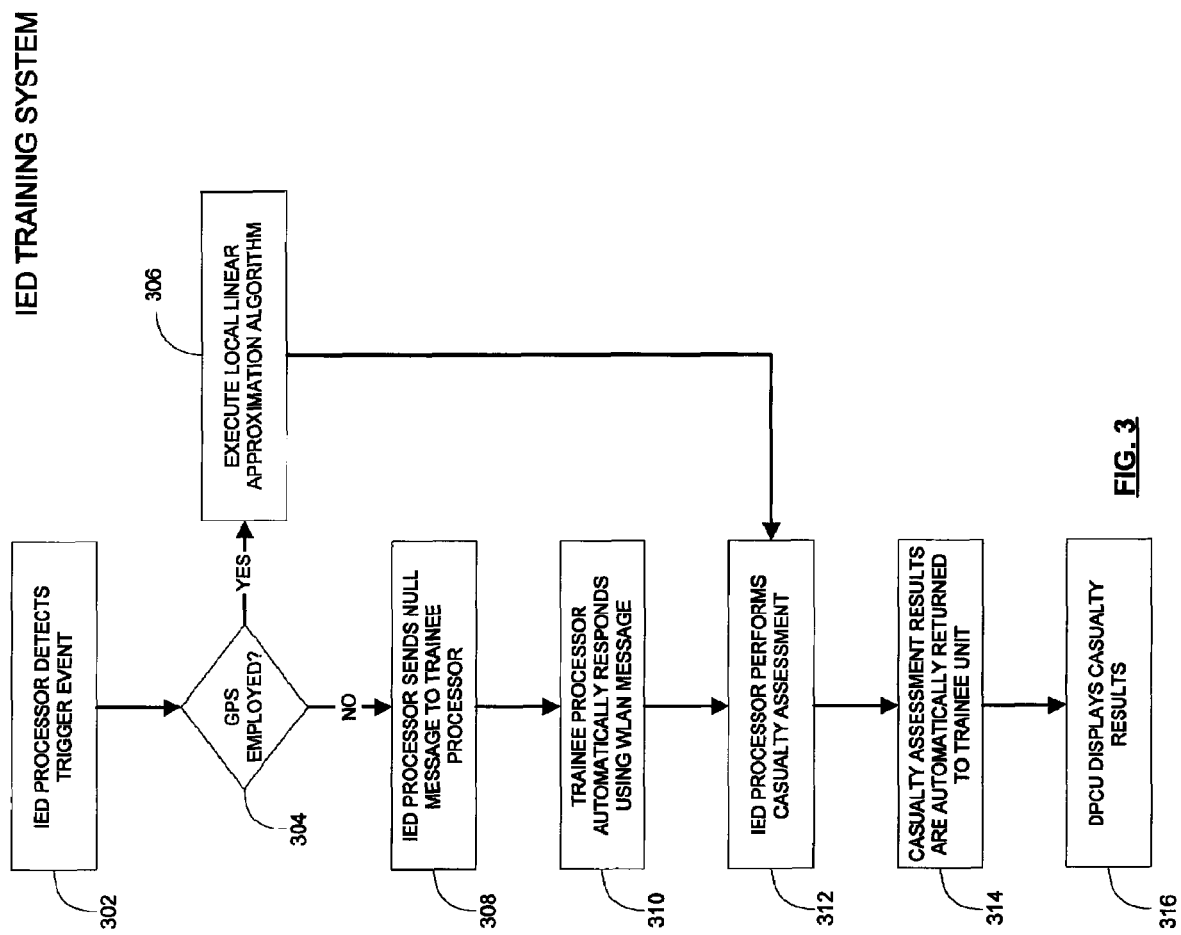

AUTOMATED IMPROVISED EXPLOSIVE DEVICE TRAINING SYSTEM

CROSS-REFERENCES TO RELATED APPLICATIONS

This application claims the benefit of U.S. Provisional Application No. 60/807,811, filed Jul. 19, 2006, entitled AUTOMATED IMPROVISED EXPLOSIVE DEVICE TRAINING SYSTEM, which is hereby incorporated herein by reference in its entirety.

FIELD OF THE INVENTION

The invention relates generally to military training systems and more particularly to a system and method for an automated improvised explosive device training system.

BACKGROUND OF THE INVENTION

Military training systems are essential to an effective combat scheme. These training systems help prepare soldiers for real time combat conditions and increase awareness of new enemy tactics. Dismounted soldiers are susceptible to a wide array of enemy attacks and therefore more intelligible training systems are needed. Ground combat training systems are particularly useful in aiding dismounted soldiers to detect potential enemy attacks such as grenades, minefields, and ambush sites.

The number of terrorists attacks have risen dramatically in recent years. Terrorist organizations have begun using a greater number of improvised explosive devices (IEDs) to target enemies. These devices are commonly placed in seemingly innocuous casings such as animal carcasses, soda cans, and boxes. They typically explode underneath or to the side of a vehicle to cause maximum damage, but insurgents have also been known to place IEDs on road signs or trees in order to hit less protected areas of armored vehicles.

Today, military IED training is practiced in a very limited extent. The current state of the art training uses IED mock-ups and pseudo pyrotechnics to create a simulated environment. When the simulated IED detonation occurs, a trainer must stop the action to tell each trainee his or her casualty status. The stoppage of action to describe the casualty status, breaks the continuity of the training such that trainees are no longer "in the moment" for reactionary procedures.

Therefore, there is a need for an IED training system that automatically alerts a trainee of his or her casualty status without disrupting the flow of the action. The desired training system should be cost effective and efficient. This system should be inexpensive enough to equip each trainee with the necessary response equipment for the combat exercise and all trainees should be able to ascertain casualty status within moments of a simulated explosion.

BRIEF SUMMARY OF THE INVENTION

This invention provides a system and method for generating automatic casualty assessment within an IED training environment.

In an exemplary embodiment, the system includes an IED mock up comprising of an IED processor and IED modem and a trainee unit comprising of a trainee processor and trainee modem. The IED processor is configured to determine distance differentiation between the IED mock up and the trainee unit. A wireless network is provided, which interfaces the IED processor with the trainee processor. Further, the IED processor is configured to determine casualty assessment data based on the distance differentiation.

Another exemplary embodiment relates to a method for automatic casualty assessment within an IED training environment. The method includes detecting a triggering event followed by determining an IED mock up position. The IED processor then queries trainees for a trainee current position. The trainee processor sends trainee current position, and the TED processor determines casualty assessment data based on the IED mock-up position and the trainee current position. Casualty status is then relayed to each trainee unit and automatically signaled to the trainee.

BRIEF DESCRIPTION OF THE DRAWINGS

The features, objects, and advantages of embodiments of the disclosure will become more apparent from the detailed description set forth below when taken in conjunction with the drawings, in which like elements bear like reference numerals.

FIG. 3 is a flow diagram of an embodiment of a method for an automated TED training system in accordance with the exemplary embodiment.

FIG. 4 is a flow diagram of an embodiment of a method for an automated IED training system when casualty assessment is performed at the trainee unit.

DETAILED DESCRIPTION OF THE INVENTION

A system and method for generating automated casualty assessment data within an improvised explosive device training system is disclosed. The following description is provided to enable any person skilled in the art to make and use the invention and sets forth the best modes contemplated by the inventor for carrying out the invention. Various modifications will remain readily apparent to those skilled in the art. Any and all such modifications, equivalents and alternatives are intended to fall within the spirit and scope of the present invention.

Figure 1:
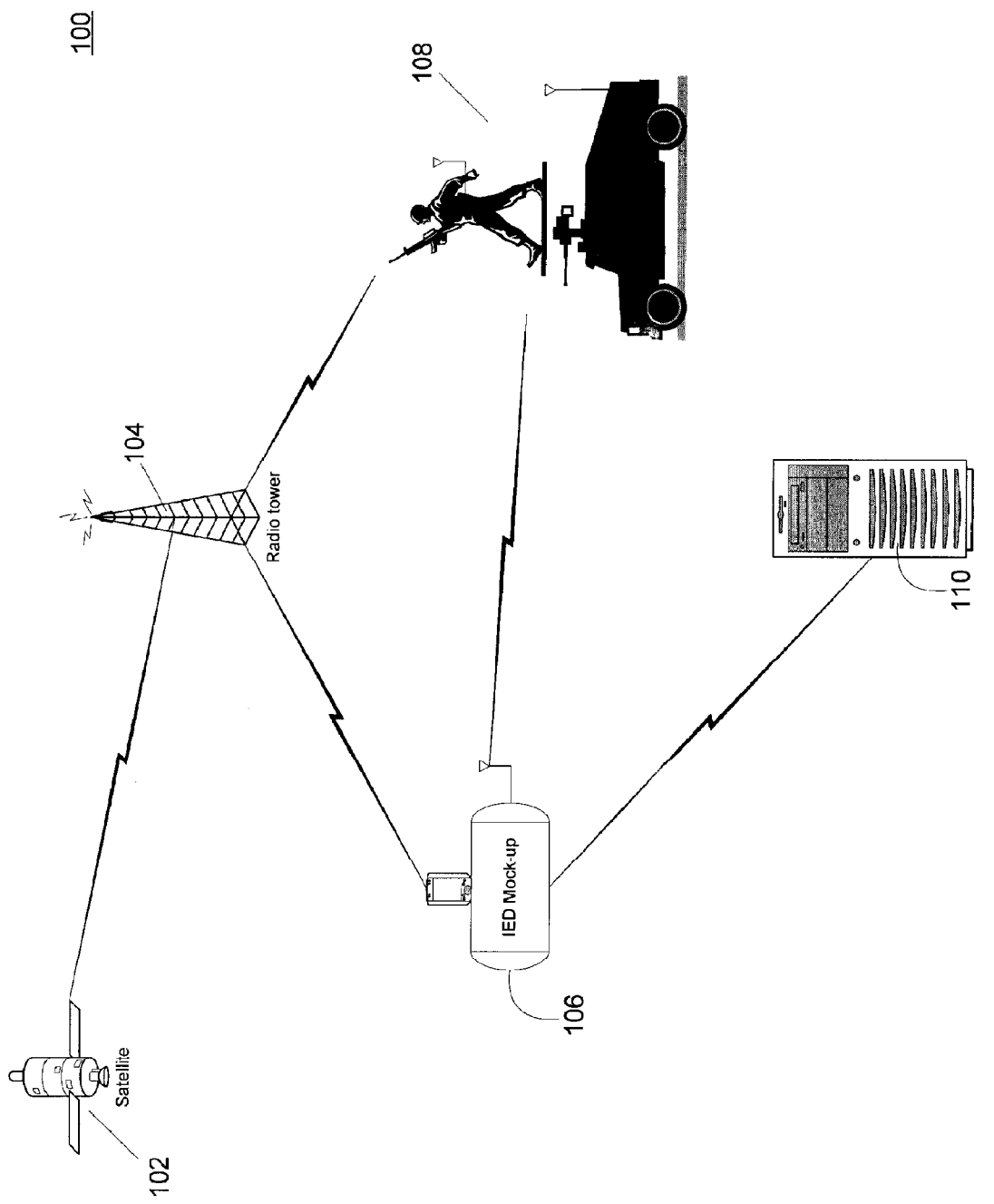
FIG. 1 is a functional block diagram of an automated IED training system in accordance with an exemplary embodiment.

Referring to FIG. 1, which illustrates a functional block diagram of an embodiment of the IED training system 100 that includes an IED mock up 106, a trainee unit 108, and a server 110. The IED mock up 106 can be constructed of materials traditionally found in an actual IED. The IED mock-up embeds a low power, low voltage, IED processor, such as an 8-bit processor, and wireless local area network (WLAN) modem for network connectivity. The IED mock-up 106 is highly configurable, allowing for several means of triggering and encompassing many different visual mock-ups. The TED can be triggered remotely by a trainer using server 110, or automatically through the use of motion sensors. Triggering methods may be accomplished through the use of a trigger interface board, alarm clock, garage door opener, pager, etc. When a simulated IED detonation occurs, pseudo pyrotechnics explode causing a real time explosive effect.

Global positing system (GPS) information can be utilized to determine location information of the IED mock-up 106 and the trainee unit 108. Geographic locating signals are provided by one or more earth-orbiting global positioning system (GPS) satellite 102. More precise locating signals in the form of differential global positioning system (DGPS) correction signals can be transmitted by a ground-based reference station 104. The reference station 104 receives downlink locating signals from satellite 102 and computes the local DPGS correction by comparing the location encoded in the downlink locating signals to the known location of reference station 102. This enhanced accuracy helps reduce the potential for false positives when casualty assessment is performed by the IED processor. Geographic locating signals are relayed to both the IED mock-up 106 and trainee units 108. A handheld device, such as PDA equipped with a GPS receiver, can be utilized to determine GPS location information of the stationary IED mock-up. The non-stationary trainee units 108 must be equipped with GPS receivers or associated with GPS receivers in order for global positioning to be employed.

A wireless local area network (WLAN) is employed to allow bi-directional communication between the IED mock-up 106 and the trainee unit 108. Preferably, this network is based on IEEE 802.15.4, or ZigBee, technology. Zigbee offers sufficient range and long battery life for low data rate applications, such as relaying received signal strength (RSS) and GPS data. Preferably, the Zigbee network will operate in non-beacon mode allowing each client to operate autonomously and initiate conversation at will. As shown in FIG. 1, server 110 serves as the personal area network (PAN) coordinator and forms the root of the network tree, maintaining overall network knowledge. As the PAN coordinator, server 110 is responsible for storing maps of the entire network to identify which nodes within the network are full function or reduced function devices and the functions of each part. Server 110 drives communications for the entire network and has the ability to dynamically establish links with new nodes on the network. The IED mock-up 106 serves as both a Full Function Device (FFD) enabling communication between other FFDs, including server 110 and other IED mock-ups, and also as a Reduced Function Devices (RFDs), such as the trainee units 108. Trainee units 108 operate typically as RFDs and therefore carry limited functionality to limit cost and complexity. As a RFD, trainee units 108 may only communicate with other FFDs such as the server 110 or IED mock-up 106, but not other trainee units. Preferably, these three devices operate in a mesh network topology allowing for nodes within range the ability to communicate with each other. Messages can be routed across the network using different stations as relays. The basic mode of channel access specified by IEEE 802.15.4 is carrier sense, multiple access/collision avoidance (CSMA/CA). In this manner, trainee units are able to communicate with the IED mock-up in the same manner as people conversing. Other WLAN radio technologies, including Bluetooth, may be employed to accomplish the purpose of the invention.

Trainee units 108 may be incorporated as a vest, worn by a trainee, or within a docking station for use on a armored vehicle. The trainees units comprise of an 8-bit trainee processor, wireless trainee modem for network connectivity, and a display processor control unit (DPCU) for signaling casualty status to the trainee. These three modules operate collectively and are explained in detail below. Alternatively, a GPS receiver may be integrated into the trainee unit 108. When global positioning is enabled, satellite 102 provides GPS downlink data to reference station 104, which in turn relays global positioning information to both the IED mock-up 106 and trainee units 108 as mentioned above. Alternatively, each trainee unit 108 may include a GPS or similar position location receiver that can determine its position based on signals from one or more satellites 102 or reference station 104.

Server 110 serves as the network coordinator for the IED training system. Through Zigbee wireless network technology, server 110, operating as the PAN coordinator, has complete network knowledge and receives location information and casualty assessment data from the IED mock-up 106 and the trainee unit 108. Software executing on the server is used to manage and update data. GPS location information can be manually inputted for each stationary IED mock-up while trainee unit's 108 location information is automatically updated according to trainee movement. Additionally, server 110 can be configured to trigger IED mock-up detonations upon demand from a trainer. Preferably, server 110 runs a version of the Multiple Integrated Laser Engagement System (MILES) and is configured to integrate downloaded casualty assessment data and location information. Other established training systems such as MILES or Ground Combat Training Center (CTC) may be utilized.

Figure 2A:
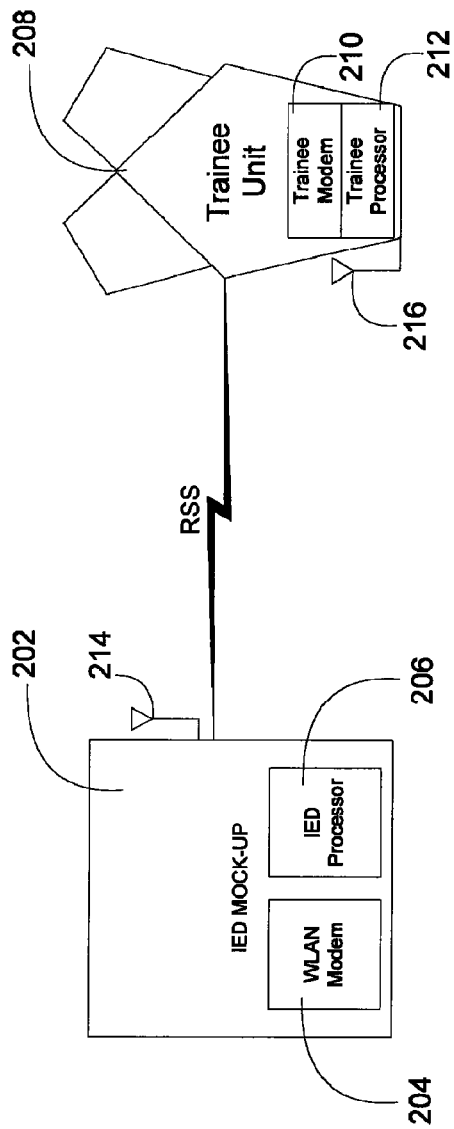
FIGS. 2A-2C are functional block diagrams of an automated IED training system.
Figure 2B:
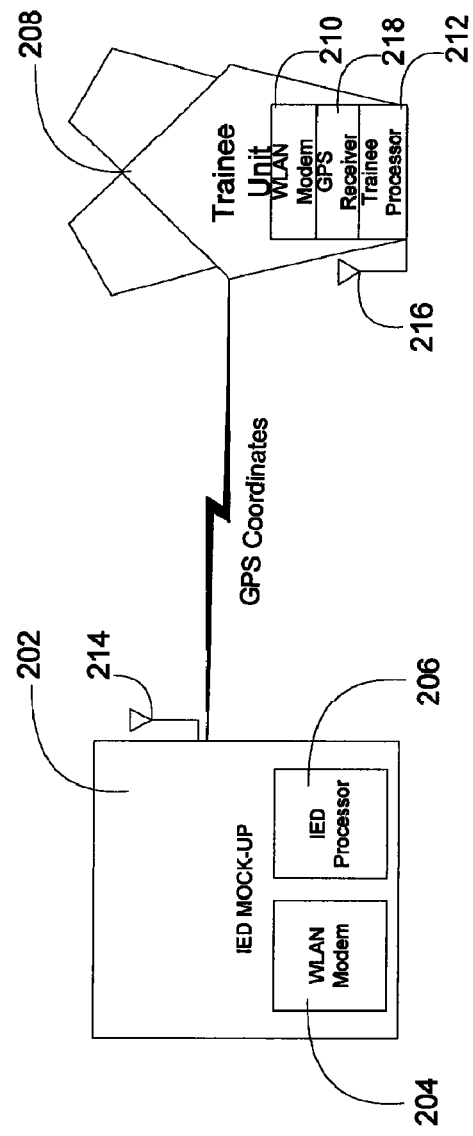
Figure 2C:
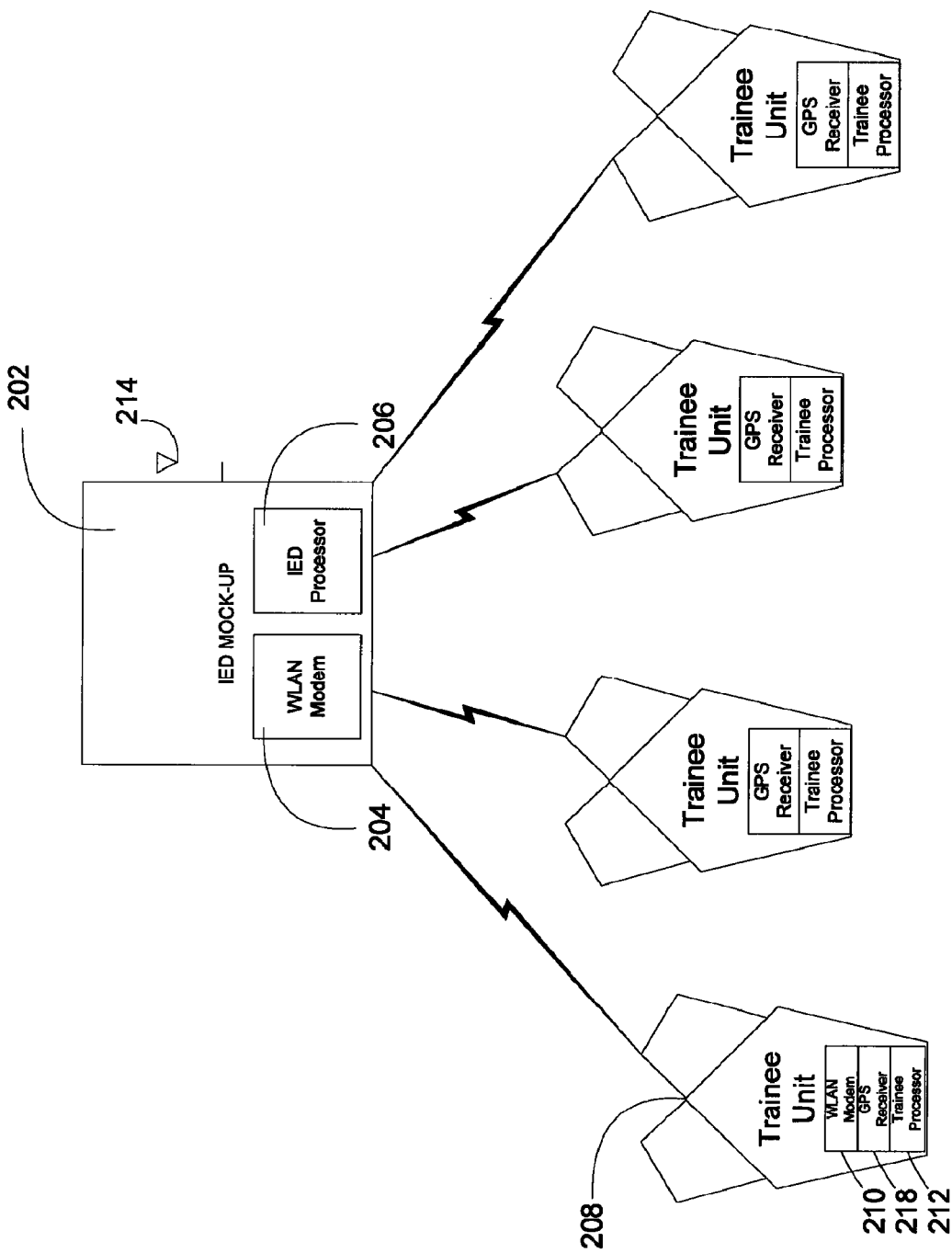

FIGS. 2A-2C are functional block diagrams of an IED training system. A distance differentiation between the TED mockup 202 and the trainee unit 208 is computed by the IED processor 206. When a simulated detonation occurs, a predetermined WLAN message, such as a null message, is sent to the trainee unit 208 through the use of TED antenna 214 and the WLAN modem 206. Preferably, IED antenna 214 and trainee antenna 216 are omni-directional antennas, enabling radiation and reception in all directions. Alternatively, IED antenna 214 can be a directional antenna in order to simulate a shaped charged detonation, in which the blast targets a particular direction. The trainee modem 210 receives the predetermined WLAN message and sends a corresponding message back to the IED processor 204. Distance differentiation can be computed by the IED processor 206 based upon the received signal strength (RSS) of the exchanged messages. Casualty status can be determined based on the computed distance differentiation and then automatically relayed to the trainee unit. For example, a trainee within a predetermined distance, such as ten feet, of a detonated IED mockup would experience severe injuries and therefore a "critically wounded" or "death" status message will be sent to the trainee processor. This system allows for real-time, automated interactivity. Before the smoke clears from the detonated IED, the trainee knows whether or not they have been affected by the blast. Alternatively, GPS position location may be employed in the IED and training units in which case GPS coordinates are exchanged as opposed to null messages as illustrated in FIG. 2B. With GPS employed, the trainee unit embeds a GPS receiver 218 in order to update position information in addition to its other components. FIG. 2C illustrates the IED training system when multiple trainee units are utilized.

FIG. 3 illustrates a flow diagram of an exemplary embodiment of the automated improvised explosive device training system. In step 302, the IED processor detects a triggering event. Real triggering mechanisms can be utilized to reinforce training and simulate actual terrorist tactics. The IED mock-up may be triggered remotely from the server or through the use of motion sensors located within the training environment. To accomplish this detonation event, pseudo pyrotechnics explode for an enhanced effect. In step 304, the IED processor interacts with the server to determine whether or not GPS is employed. If GPS is employed, a step 306 is performed in which the IED processor executes the Local Linear Approximation Algorithm ("LLA Algorithm") to determine distances, and associated casualty status.

The LLA Algorithm facilitates accurate computation of short distances between two sets of GPS coordinates. Given the longitude and latitude of two points in close proximity to each other, the LLA Algorithm is capable of computing a quick and accurate distance between the two points. The algorithm splits the trigonometric workload into two phases, one performed when the location of the IED mock-up is established, the other performed with each casualty assessment and therefore reducing the real-time processing burden. The LLA Algorithm utilizes a relatively straight forward trigonometry approach which uses a single value for earth radius and involves taking an inverse cosine. Since points can be very close together, there are accuracy issues involved with the numerical computations of the trig functions in the solution. To overcome these issues, the solution first determines the meridonal and transverse radii of curvature:

$$R_M = \frac{a(1-e^2)}{(1-e^2\sin^2\phi_1)^{3/2}} \quad (1)$$

$$R_t = \frac{a}{(1-e^2\sin^2\phi_1)^{1/2}} \quad (2)$$

Using the WGS-84 figure of the earth with:
a=6378137 m (equatorial radius)
e=0.08181919 (eccentricity)

Since the IED training system deals mostly with distances of various points (i.e. the trainee units) with respect to a single point (i.e. the IED mock-up) in a reasonably small area, equations (1) and (2) need be solved only one time.

The following local linear approximation can be used to find the distance between the two points:

$$dx = R_t \cos\phi_1(\lambda_2-\lambda_1) \quad (3)$$

$$dy = R_M(\phi_2-\phi_1) \quad (4)$$

$$\text{distance} = \sqrt{dx^2+dy^2} \quad (5)$$

Computations are further simplified in the current application because we are finding distances with respect to a fixed point, thus the cosine in (3) above need only to be computed once. Furthermore, if determining event outcomes based on the distance from the IED mock-up, then only distance squared needs to be computed and the square root in (5) need not be taken. The result is a highly efficient and fast algorithm, producing very accurate results.

After step 306, a step 312 is executed in which the IED processor generates casualty assessment data based on the distance differentiation determined by the LLA Algorithm. Casualty status can be based on one or more parameters such as, for example, distance. In other casualty assessment configurations, other parameters may contribute to the casualty status. for example, the location of obstructions or protective terrain may be parameters that are used in conjunction with distance to determine the casualty status of each trainee unit. In step 314, the casualty assessment data indicative of the casualty status is then returned to the trainee via a WLAN message. After step 314, a step 316 is executed in which the DPCU displays the casualty results to the trainee.

If global positioning is not employed, then a step 308 is performed in which the IED processor sends out a null message to the trainee units. After step 308, a step 310 is performed in which the trainee processor receives the null message and automatically sends an acknowledgment message back to the IED processor. After step 310, a step 312 is performed in which TED processor performs casualty assessment. Since GPS is not employed, casualty assessment is determined by the received signal strength (RSS) of the acknowledgement message. The RSS of the exchanged WLAN messages enables the IED processor to determine a distance differentiation between its location and the current position of the trainee unit. A pairing algorithm in, for example, the ZigBee chip, located in the TED processor, compares the received signal strength indicator (RSSI) data received by each node to determine the closest node in the network through signal to noise ratios (SNR). Stronger RSSI or higher SNR indicates closer proximity while weaker RSSI or a lower SNR indicates more remote proximity. A lower SNR may also indicate the presence of an obstruction between the trainee unit and the IED. An obstruction that reduces the SNR, such as a wall, building, structure, or terrain, can result in some protection to the warfighter possessing the trainee unit from the simulated explosion. For example, a SNR of 10-15 db would indicate a close proximity, generating a severe casualty status such as "critically wounded", while a 0-5 dB SNR would indicate a remote proximity and thus a "no damage" casualty assessment. After step 312, a step 314 is performed in which the casualty assessment data is automatically returned to the trainee units. Lastly, a step 316 is performed in which the DPCU displays the casualty status to the trainee. This entire transmission is accomplished real-time, thereby avoiding any break in training continuity.

Alternatively, casualty assessment may be accomplished by the trainee processor. FIG. 4, illustrates a flow diagram when casualty assessment is performed at trainee unit. A step 402 is performed in which the IED processor detects a trigger event. A trigger event may be activated from the trainer via the server or through the activation of a motion sensor within the training environment. Once triggered, a step 404 is performed in which the IED processor sends a WLAN message detailing the attributes of the blast, including IED position and blast radius information. Upon receiving the WLAN message as indicated in step 406, a step 408 is performed in which the trainee processor performs casualty assessment. The trainee processor compares its current position with the IED position and blast radius information received form the IED processor and determines if the trainee unit is within range of the blast attributes. Once casualty assessment is rendered by the trainee processor, a step 410 is executed in which the DPCU displays the casualty status to the trainee.

Figure 5:
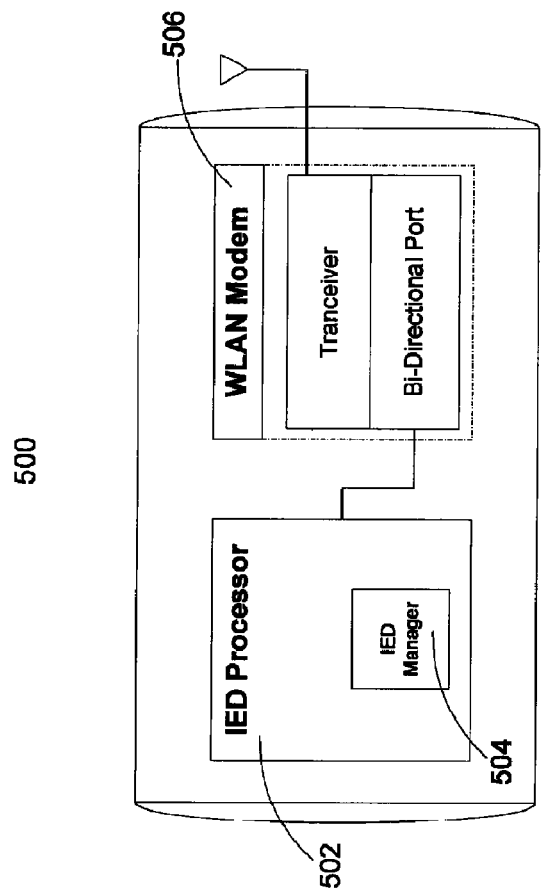
FIG. 5 is a functional block diagram of an embodiment of an IED mock up.

FIG. 5 illustrates a functional block diagram of an IED mock up in accordance with an embodiment of the present invention. The TED mock up 500 consists of two primary components, the IED processor 502 and WLAN modem 506. The IED manager 504 can be implemented as a software program which executes on the IED processor. The IED manager 504 allows for manual selection of configuration options, detects trigger events, and performs casualty assessment. Once a trigger event is detected by the IED manager 504, a null message is sent by the IED processor 502 through the WLAN modem 506 to determine distance differentiation. As mentioned earlier, the WLAN modem 506 is a FFD capable of sending and receiving messages to and from the server and trainee unit.

Figure 6:
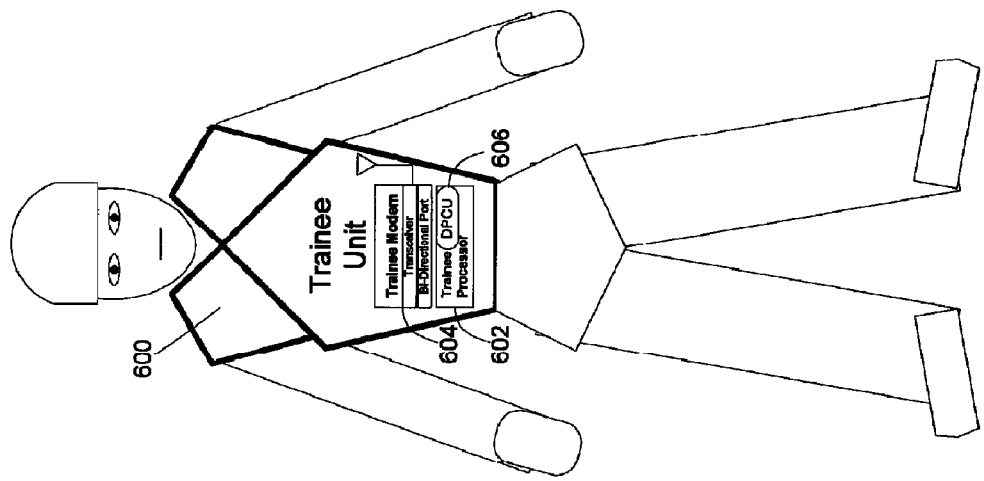
FIG. 6 is a functional block diagram of an embodiment of a trainee unit.

FIG. 6 illustrates a functional block diagram of the trainee unit according to an exemplary embodiment of the present invention. The trainee unit 600 comprises three main components, the trainee processor 602, the trainee modem 604, and the DPCU 606. The DPCU 606 interacts with the trainee processor 602 and is responsible for updating position information when GPS is employed, responding to queries form the IED, and displaying casualty status. When GPS is not employed, and upon receipt of a null WLAN message from the IED mock-up, the DPCU 606 processes a null WLAN message to be sent back to the IED mock-up. When GPS is employed, and upon receipt of a WLAN message containing GPS coordinates, the DPCU 606 processes current position information and sends to the IED mock-up. Once casualty assessment is rendered, whether by the IED processor or processed locally at the trainee unit, the DPCU alerts the trainee of their casualty status. The DPCU can be located anywhere on the trainee unit or trainee so that a trainee can easily ascertain their casualty status, e.g. on the trainee unit, or on the trainee's arm or head. Preferably, casualty status will be rendered through the DPCU in a visible and audible manner. The DPCU can also be configured to signal casualty status strictly audibly or visibly. The DPCU can be in the form of an arm band, wrist watch or optionally integrated into a headset.

It will be recognized by persons of ordinary skill in the art that the method of the invention has many applications, and that this description has not attempted to enumerate all possible variations. The scope of the invention also extends to various combinations and modifications that may fall within the spirit of the appended claims.

What is claimed is:

1. A system for generating automated casualty assessment in an improvised explosive device (IED) training environment comprising:
   an IED mock-up including an IED modem for network connectivity;
   at least one trainee unit including a trainee modem for network connectivity;
   an IED processor and trainee processor, wherein the IED processor is configured to determine a distance differentiation between the IED mock-up and the at least one trainee unit, wherein the distance differentiation is based on a received wireless signal strength of the at least one trainee unit;
   a wireless network interface that communicatively couples the IED processor with the trainee processor; and
   an IED manager coupled to the IED processor and configured to generate casualty assessment data based on the distance differentiation between the IED mock-up and the at least one trainee unit, and automatically relaying the casualty assessment data to the at least one trainee unit via the wireless network interface.

2. The system for generating automated casualty assessment in an improvised explosive device (IED) training environment as recited claim 1, wherein the IED mock-up is soda can, barrel, box, or any other hidden explosive compartment.

3. The system for generating automated casualty assessment in an improvised explosive device (IED) training environment as recited claim 1, wherein the at least one trainee unit is a solider vest.

4. The system for generating automated casualty assessment in an improvised explosive device (IED) training environment as recited claim 1, wherein the at least one trainee unit is a docking station for use on a vehicle.

5. The system for generating automated casualty assessment in an improvised explosive device (IED) training environment as recited claim 1, wherein the distance differentiation is based on global positioning system (GPS) coordinates of the IED mock-up and the trainee unit.

6. The system for generating automated casualty assessment in an improvised explosive device (IED) training environment as recited claim 1, wherein the wireless network interface is ZigBee IEEE 802.15.4 standard.

7. The system for generating automated casualty assessment in an improvised explosive device (IED) training environment as recited claim 1, wherein casualty assessment is performed at the trainee processor.

8. An apparatus for generating automated casualty assessment in an improvised explosive device (IED) training environment comprising:
   an IED modem for network connectivity; and
   an IED processor configured to determine distance differentiation between the IED mock-up and a trainee unit, wherein:
   the distance differentiation is used to process casualty assessment data; and
   the distance differentiation is determined based on a received signal from the trainee unit.

9. The apparatus for generating automated casualty assessment in an improvised explosive device (IED) training environment as recited claim 8, wherein the distance differentiation is based on received signal strength.

10. The apparatus for generating automated casualty assessment in an improvised explosive device (IED) training environment as recited claim 8, wherein the distance differentiation is based on global positioning system (GPS) coordinates.

11. An apparatus for generating automated casualty assessment in an improvised explosive device (IED) training environment comprising:
    a trainee modem for network connectivity;
    a trainee processor configured to send and receive wireless local area network messages; and
    a signaling device to alert a trainee of casualty status, wherein:
    the trainee processor is configured to determine a distance between an IED mock-up and the trainee, and
    the trainee processor is configured to perform casualty assessment based on the distance between the IED mock-up and the trainee.

12. The apparatus for generating automated casualty assessment in an improvised explosive device (IED) training environment as recited claim 11, wherein the signaling device alerts the trainee either audibly or visibly.

13. The apparatus for generating automated casualty assessment in an improvised explosive device (IED) training environment as recited claim 11, wherein the distance between the IED mock-up and the trainee is based on received signal strength (RSS).

14. The apparatus for generating automated casualty assessment in an improvised explosive device (IED) training environment as recited claim 11, wherein the distance between the IED mock-up and the trainee is based on global positioning system (GPS) coordinates.

15. A method for generating automated casualty assessment in an IED training environment, the steps comprising:
    detecting an IED trigger event;
    determining an IED mock-up position;
    querying a trainee unit for a trainee current position via a wireless local area network (WLAN) message;
    receiving the trainee current position via WLAN message;
    determining a distance differentiation based upon a distance between the IED mock-up position and the trainee current position;
    determining casualty assessment data using the distance differentiation; and
    relaying casualty assessment data automatically to trainee unit.

16. The method for generating automated casualty assessment in an improvised explosive device (IED) training environment as recited claim 15, wherein the trigger event is accomplished manually from a trainer or automatically through the use of motion sensors.

17. The method for generating automated casualty assessment in an improvised explosive device (IED) training environment as recited claim 15, wherein determining a distance differentiation is based upon received signal strength of the WLAN messages.

18. The method for generating automated casualty assessment in an improvised explosive device (IED) training environment as recited claim 15, wherein determining a distance differentiation is based upon global positioning system (GPS) coordinates of the IED mock-up and trainee unit.

19. A computer-readable memory containing program instructions for generating automated casualty assessment in the IED training environment of claim 15.

20. A method for generating automated casualty assessment in an IED training environment, the steps comprising:
receiving a request for trainee position information from an IED processor;
sending trainee position information via a wireless local area network (WLAN) message to the IED processor;
receiving casualty assessment data from the IED processor via a WLAN message, wherein the casualty assessment data is calculated based on a distance differentiation between the IED processor and the trainee position information; and
signaling casualty status automatically to a trainee based on the casualty assessment data.

21. A computer-readable memory containing program instructions for generating automated casualty assessment in the IED training environment of claim 20.

22. A method for generating automated casualty assessment in an IED training environment, the steps comprising:
detecting an IED trigger event;
determining an IED position and blast radius information;
sending the IED position and blast radius information to the trainee processor via a wireless local area network message;
receiving a wireless signal from the trainee processor via the local area network;
determining whether a trainee is within the blast radius by calculating a distance differentiation between the IED position and the trainee processor based on the wireless signal received from the trainee processor;
determining a casualty assessment for the trainee based on whether the trainee is within the blast radius.

23. The method for generating automated casualty assessment in an improvised explosive device (IED) training environment as recited claim 22, wherein the trigger event is accomplished manually from a trainer or automatically through the use of motion sensors.

24. A computer-readable memory containing program instructions for generating automated casualty assessment in an IED training environment of claim 22.

25. A method for generating automated casualty assessment in an IED training environment, the steps comprising:
receiving an IED position and blast radius information from an IED processor via a wireless local area network message;
sending a signal to the IED processor that indicates a relative distance from the IED processor;
receiving a casualty status based on the relative distance from the IED processor; and
signaling casualty status automatically to a trainee based on the casualty assessment data.

26. A system for generating automated casualty assessment in an improvised explosive device (IED) training environment comprising:
an IED mock-up including an IED means for network connectivity;
at least one trainee unit including a means for network connectivity;
an IED processor and trainee processor, wherein the IED processor includes a means to determine a distance differentiation between the IED mock-up and the at least one trainee unit, wherein the distance differentiation is determined based on a received signal from the at least one trainee unit;
a wireless communication means for bidirectional communication between the IED processor with the trainee processor;
an IED manager coupled to the IED processor including a means to generate casualty assessment data based on the distance differentiation between the IED mock-up and the at least one trainee unit, and automatically relaying the casualty assessment data to the at least one trainee unit via the wireless communication means.

\* \* \* \* \*

UNITED STATES PATENT AND TRADEMARK OFFICE
CERTIFICATE OF CORRECTION

PATENT NO. : 8,408,907 B2
APPLICATION NO. : 11/780414
DATED : April 2, 2013
INVENTOR(S) : Robert Herbert et al.

Page 1 of 1

It is certified that error appears in the above-identified patent and that said Letters Patent is hereby corrected as shown below:

In the Specification:

Column 2, line 9, please delete "TED" and insert --IED--.
Column 2, line 27, please delete "TED" and insert --IED--.
Column 2, line 59, please delete "TED" and insert --IED--.

Column 4, line 21, please delete "TED" and insert --IED--.
Column 4, line 25, please delete "TED" and insert --IED--.

Column 5, line 65, please delete "TED" and insert --IED--.

Column 6, line 5, please delete "TED" and insert --IED--.
Column 6, line 46, please delete "TED" and insert --IED--.

Signed and Sealed this
Eleventh Day of June, 2013

Teresa Stanek Rea
*Acting Director of the United States Patent and Trademark Office*